UNITED STATES PATENT OFFICE.

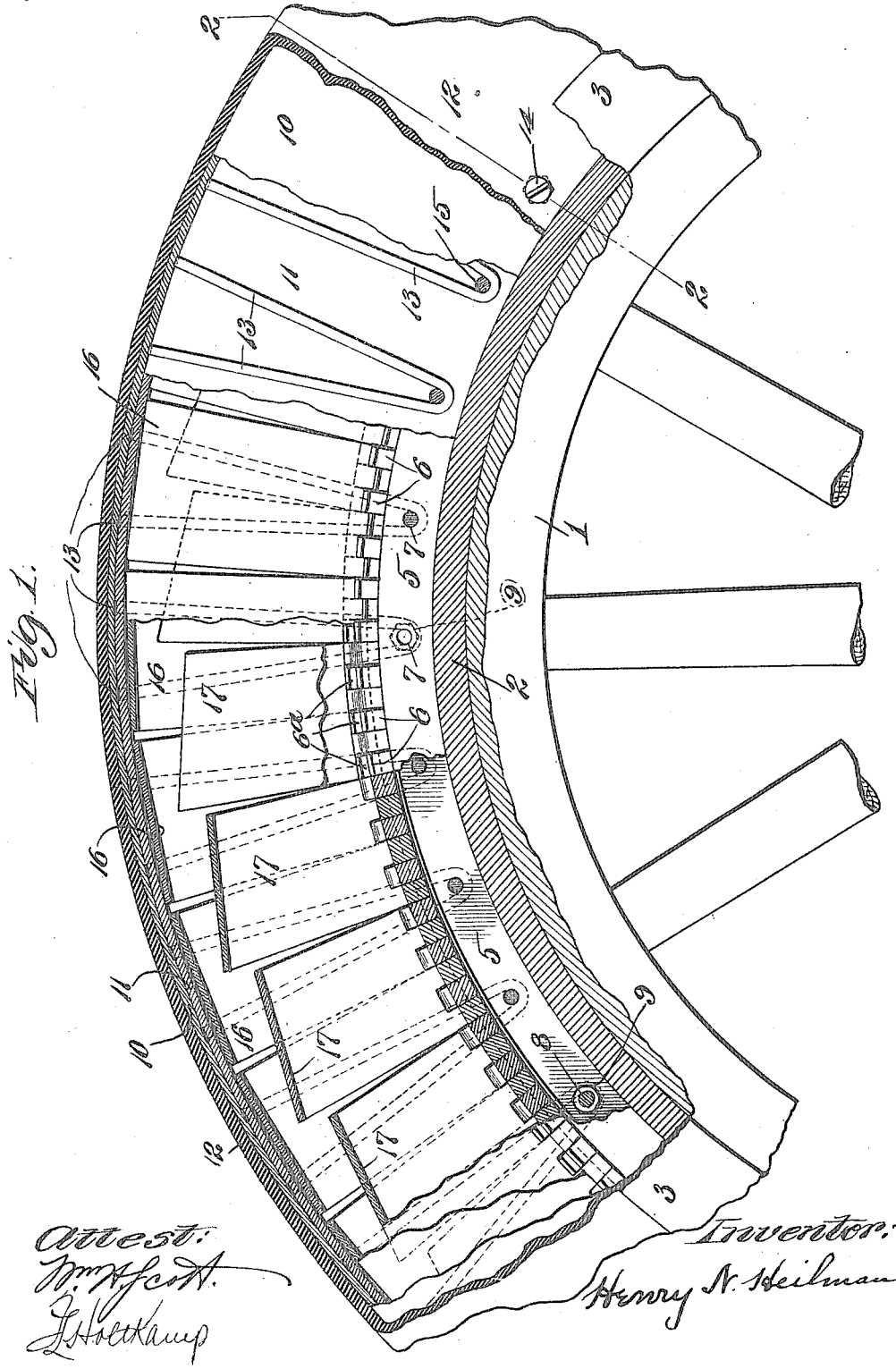

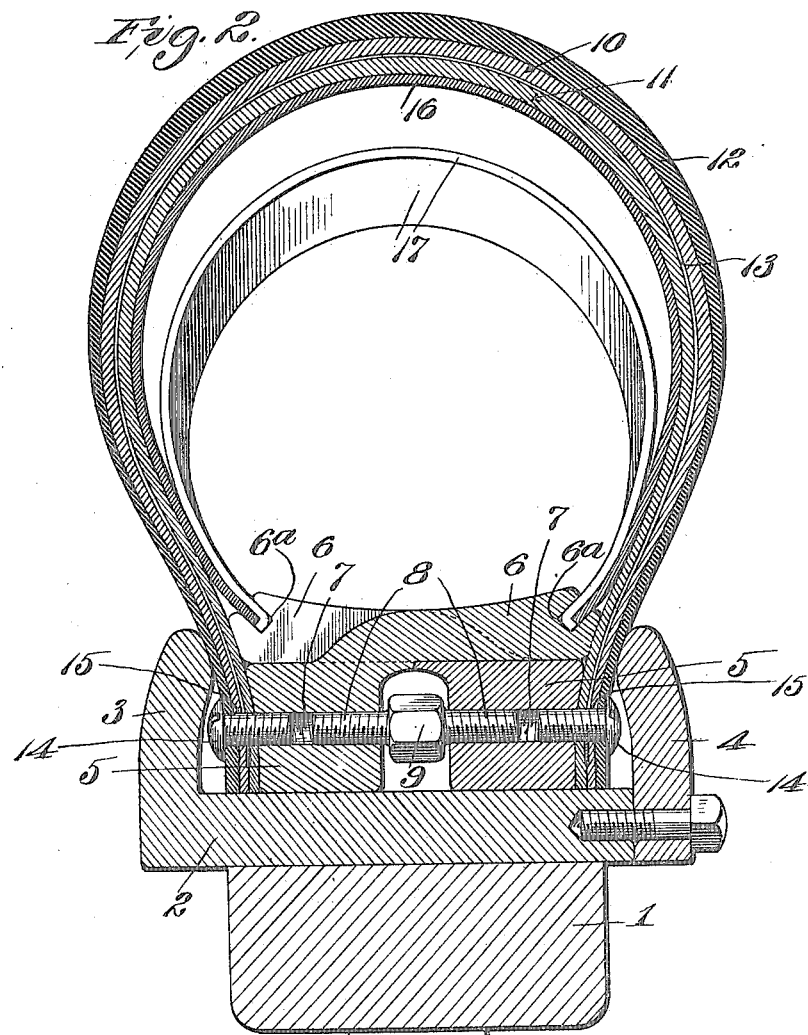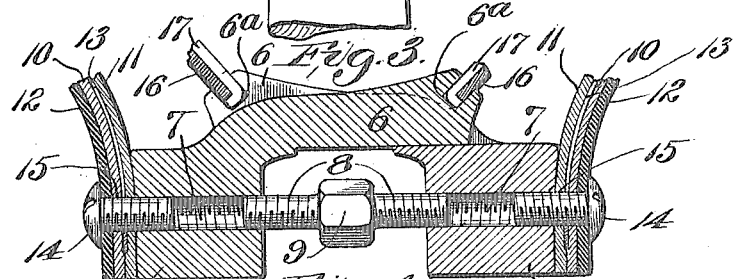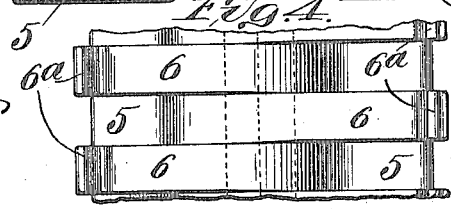

HENRY N. HEILMAN, OF ST. LOUIS, MISSOURI.

CUSHION-TIRE.

1,136,009.  Specification of Letters Patent.  Patented Apr. 20, 1915.

Application filed March 22, 1913. Serial No. 756,175.

*To all whom it may concern:*

Be it known that I, HENRY N. HEILMAN, a citizen of the United States, residing in the city of St. Louis, State of Missouri, have invented certain new and useful Improvements in Cushion-Tires, of which the following is a specification.

My invention relates generally to resilient tires for vehicles, and more particularly to a tire of the cushion type wherein a flexible casing inclosing a series of resilient yielding members is arranged upon the felly or rim of the wheel.

The principal object of my invention is to provide a cushion tire which is comparatively simple and inexpensive, and which cushion tire has all the desirable features of an inflatable tire without the objectionable features of blow-outs and deflations resulting from punctures.

A further object of my invention is to combine a flexible casing or shell with means, parts of which latter are resilient and yielding, and which means, when properly manipulated, will simultaneously impart internal expansion to the casing or shell and stretch or draw said casing or shell tightly over the internally arranged expanding means. The result of this particular construction is the provision of a tire which will yieldingly support considerable weight, and which, in use, will absorb and reduce shocks and vibrations to which the tire is ordinarily subjected.

To the above purposes my invention consists in certain novel features of construction and arrangement of parts hereinafter more fully described, claimed and shown in the accompanying drawings, in which, Figure 1 is a side elevational view of a portion of a tire of my improved construction with parts thereof broken away, and with parts in section in order to more clearly illustrate the construction of the tire. Fig. 2 is an enlarged cross sectional view taken approximately on the line 2—2 of Fig. 1. Fig. 3 is a detail sectional view of a pair of coöperating rings forming a part of my improved tire, the same being shown separated or spread apart. Fig. 4 is a fragmentary plan view of portions of the coöperating rings.

Referring by numerals to the accompanying drawings, 1 designates the usual wheel felly upon which is mounted a rim 2, the same being provided on one side with an integral flange 3, and on the opposite side with a removable flange 4. Loosely mounted upon the rim 2 between the flanges 3 and 4 is a pair of metal rings 5, each being provided with a series of laterally projecting fingers 6, and when these rings are properly assembled upon the rim 2, the fingers of one ring lie between the fingers of the opposite ring, and likewise, the fingers of one ring overlie the opposite ring. Formed in the outer ends of these fingers are notches 6$^a$ which receive the ends of the resilient supports, hereinafter more fully described.

Formed through the rings 5 are transversely disposed apertures 7, and the apertures in one ring are provided with right hand screw threads, while those in the opposite ends are provided with left hand screw threads. Screw-seated in a corresponding pair of these apertures are the threaded ends of a bolt 8, the same being provided with a centrally arranged head 9, which is adapted to be engaged by a wrench, or suitable tool, and when this bolt is rotated, the rings 5 are drawn together, or moved apart, corresponding to the direction of rotation of the bolt. These bolts are arranged at suitable distances apart, and as shown in Fig. 1, said bolts are arranged in every fourth pair of apertures 7. It will be readily understood that these bolts may be spaced apart as desired.

The flexible casing or shell of my improved tire comprises an outer layer 10 of fabric, or a combination of fabric and rubber, and an inner layer 11 of like material, the same being attached to each other in any suitable manner, and overlying the outer layer 10 is a layer or section of rubber 12 or analogous material. Interposed between the layers 10 and 11 of fabric are supporting members 13, preferably formed of thin pieces of resilient metal in the form of loops, the same being substantially U-shaped and the ends of these members terminate adjacent to the edges of the parts 10, 11 and 12.

When the casing is applied to the rings 5 screws 14 are positioned through suitably formed apertures 15 in the edges of the parts 10, 11 and 12, the body portions of which screws pass through the ends of the members 13 and engage in the threaded apertures 7 in the rings 5. Thus the ends of the members 13 are anchored to the screws 15, which latter connect the edges of the casing to the rings 5, and said members 13 form metallic stays to prevent the casing from being over-expanded by the internally arranged expanding means. This internally arranged expanding means comprises a series of substantially U-shaped members 16, preferably formed of resilient metal, said members lying immediately against the inner face of the inner layer of flexible material 11, and the ends of said members 16 occupy the notches in the ends of the fingers 6. A second set of resilient material, preferably metal, are arranged inside the members 16, and the ends of this second series of members 17 are located in the slots 6 with the ends of the members 16.

The inner series of members 17 are formed so that their body portions in cross section are arranged at slight angles relative to the planes occupied by the members 16, and the highest edge of each inner member is preferably located immediately opposite the central portion of the corresponding outer member 16. These inner members form auxiliary internal supports, and when the tire is subjected to an extra heavy load so that the tread portion of the tire is abnormally compressed, the central portions of the outer members 16 which are under compression will bear against the highest edges of the corresponding inner members 17, and this reinforcement readily takes care of the abnormal pressure developed by increased loads.

When my improved tire is assembled the bolts 8 are manipulated so as to separate the rings 5, as shown in Fig. 3, and when so positioned the edges of the casing comprising the parts 10, 11 and 12 are widely separated, and thus the body of the casing is in a comparatively loose condition with respect to the members 16 and 17, which latter are necessarily contracted, due to the fact that their ends are seated in the notches 6ª, which latter are comparatively close to each other. The heads 9 on the centers of the bolts 8 are now engaged by a wrench, or suitable tool, and said bolts are rotated so as to draw the rings 5 toward each other, and as a result, the edges of the casing which are attached to said rings are drawn toward each other and simultaneously the ends of the resilient members 16 and 17 seated in the ends of the fingers 6 are moved away from each other, thereby expanding said members 16 and 17 within the casing. This adjustment of the bolts 8 is continued until the casing is drawn perfectly tight over the members 16 and 17, and thus said casing is stretched over the resilient supporting members 16 and 17, and which latter have been expanded within the casing to form a resilient internal support therefor. When the tire has been properly stretched or tightened the rings 5 are applied to the rim 2, after which the flange 4 is attached to said rim, and the wheel is now in condition to be placed on its axle.

A tire of my improved construction can be easily and cheaply manufactured, and being yielding and resilient, is possessed of all the desirable qualities of an inflated tire, without having the undesirable features of being subject to punctures, blow-outs and the repairs incident thereto.

It will be readily understood that minor changes in the size, form and construction of the various parts of my improved tire can be made and substituted for those herein shown and described without departing from the spirit of my invention, the scope of which is set forth in the appended claims.

I claim:

1. In a tire, a casing, rings connected to the edges thereof, overlying fingers on said rings, and an expansible resilient support connected to said fingers within the casing.

2. In a tire, a casing, rings having overlying fingers, to which rings the edges of the casing are connected, and an expansible resilient support coöperating with said fingers, and arranged within the casing.

3. In a tire, a casing, transversely disposed inextensible bands in said casing, rings having overlying fingers, to which rings the edges of the casing are connected, and an expansible resilient support connected to said fingers within the casing.

4. In a tire, a casing, transversely disposed inextensible bands within said casing, rings having overlying fingers to which rings the edges of the outer casing are connected, an expansible resilient support within the casing, and coöperating with the fingers on the rings, and means for imparting lateral movement to said rings, the resilient support, and the casing.

5. In a tire, a casing, transversely disposed inextensible bands embedded in said casing, an annular supporting means comprising a pair of rings adapted to move toward and away from each other, parts of which rings overlie each other, and a series of internally arranged transversely disposed resilient supporting members connected to the overlying parts of the rings, which rings and resilient supports are contained within the casing.

6. In a tire, an outer casing, a pair of rings arranged therein, portions of which rings overlap transversely, and a resilient sectional support within the casing, which support is connected to the over-lapping portions of the rings.

7. In a tire, an outer casing, a pair of rings, arranged therein, overlying fingers on said rings, and a resilient sectional support within the casing, which sectional support is connected to the overlying fingers.

8. The combination with a wheel rim, of a casing, a pair of annular members arranged for movement upon said rim, portions of which annular members overlap each other, a series of resilient supporting members arranged within the casing and coöperating with the over-lapping portions of said annular members.

9. In a tire, a casing, a pair of annular counter-movably connected members, portions of which overlap each other, a series of resilient casing supporting members coöperating with the overlapping portion of the annular members.

10. In a tire, a casing, a series of inextensible bands arranged therein, a pair of annular counter-movably connected members, portions of which overlap each other, connected to the edges of said casing, a series of resilient casing supporting members coöperating with the overlapping portions of the annular members, whereby counter-movement is produced between the casing and said supporting members when said annular members are moved toward and away from each other.

In testimony whereof I hereunto affix my signature in the presence of two witnesses, this 20th day of March, 1913.

HENRY N. HEILMAN.

Witnesses:
F. L. HOLTKAMP,
L. O. HUMPHREYS.

Copies of this patent may be obtained for five cents each, by addressing the "Commissioner of Patents, Washington, D. C."